July 7, 1936. M. A. PALEN 2,046,424
TACTICAL INFANTRY EQUIPMENT
Filed Nov. 6, 1934 3 Sheets-Sheet 1
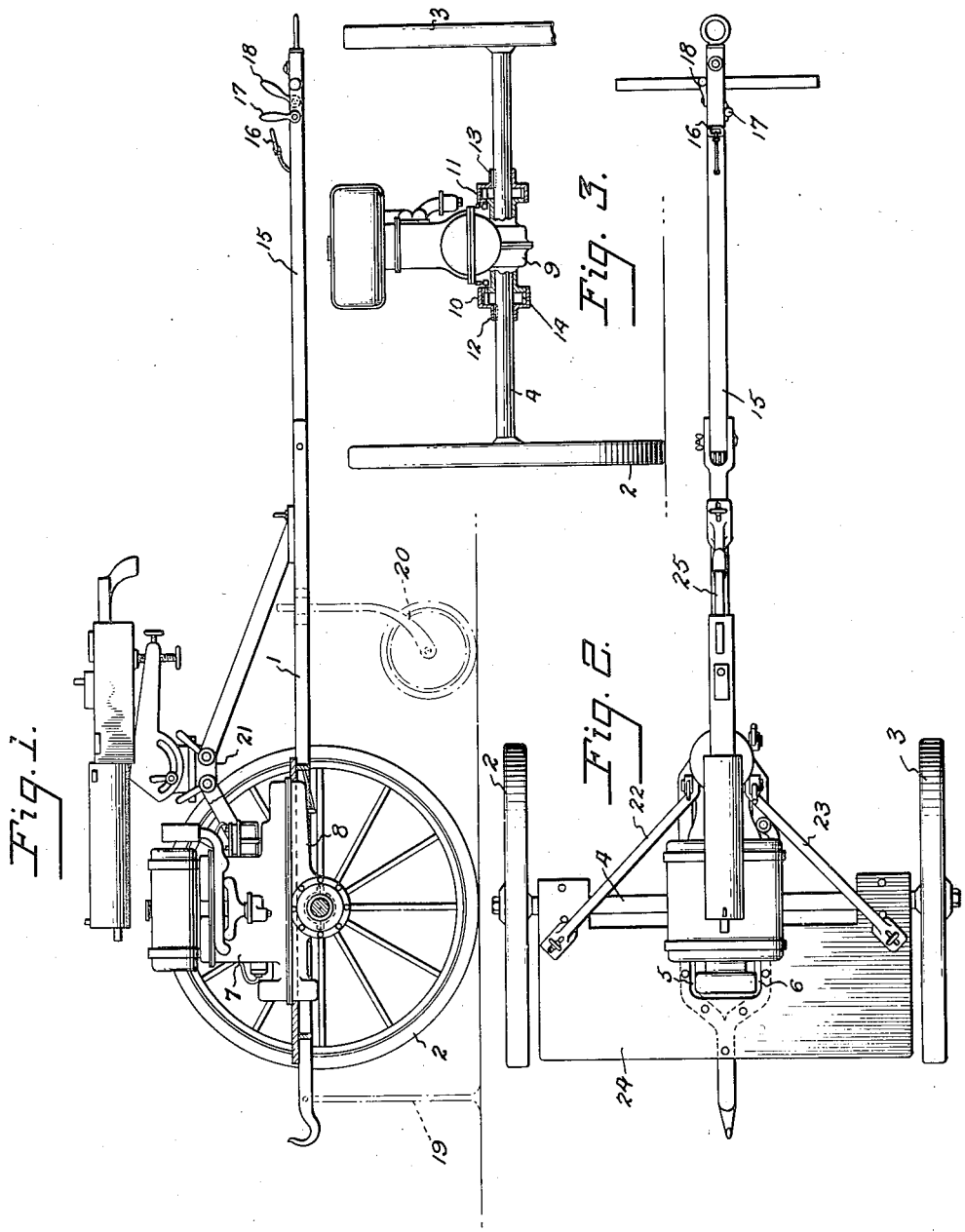
Inventor
M. A. Palen
By Mason Fenwick Lawrence
Attorneys

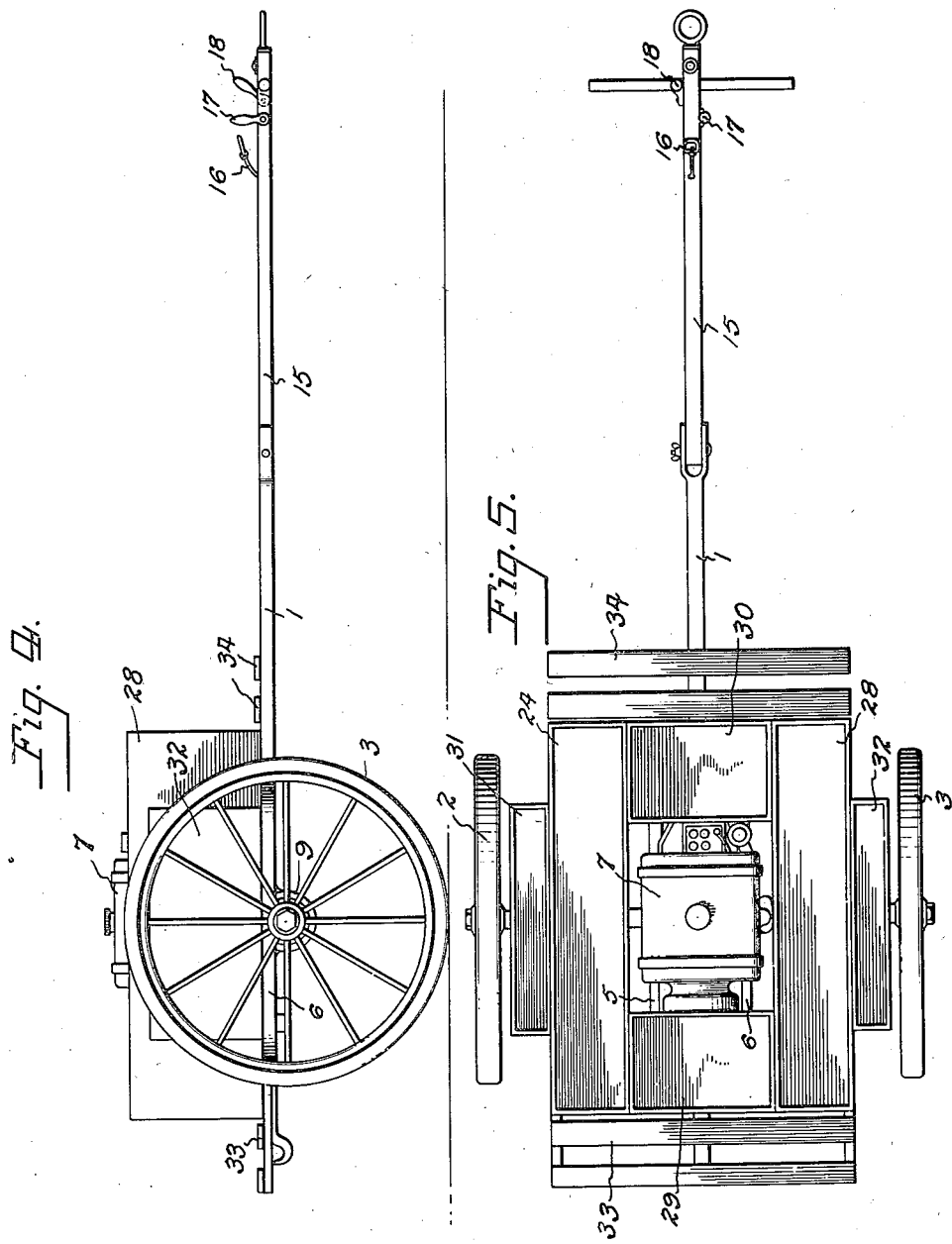

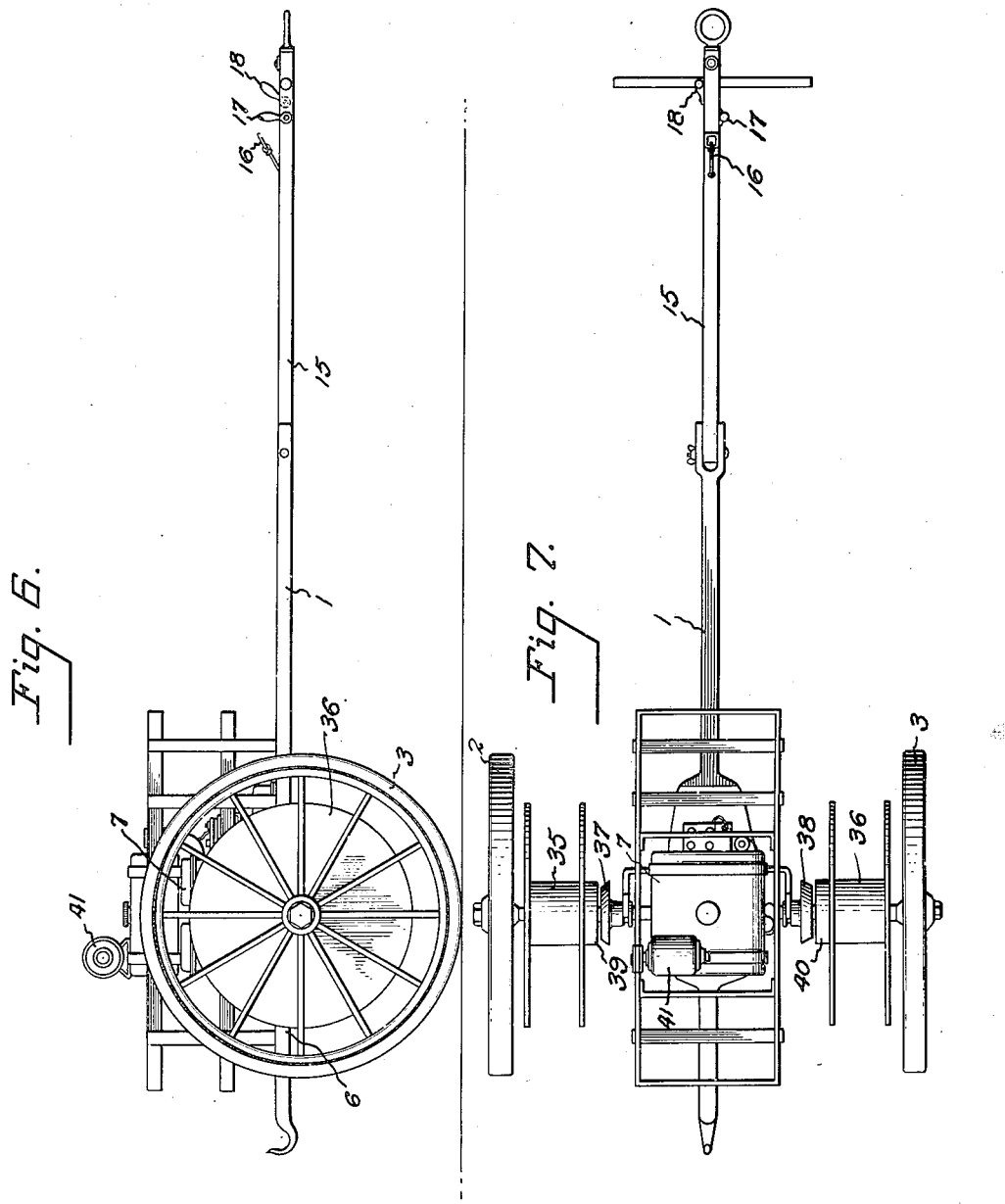

Patented July 7, 1936

2,046,424

UNITED STATES PATENT OFFICE 2,046,424

TACTICAL INFANTRY EQUIPMENT

Matthew A. Palen, Bethesda, Md., assignor to John C. Palen, Sacramento, Calif.

Application November 6, 1934, Serial No. 751,755

1 Claim. (Cl. 180—19)

This invention relates to the motorizing of tactical infantry equipment such as machine gun carts, ammunition carts, reel carts, instrument carts, trench mortar carts, 37 mm. gun carts, etc., which are ordinarily pulled by mule power on the road and drawn by man power on the field of combat where the mule cannot be employed on account of its size and vulnerability.

It is, of course, concededly old to employ motorization in the general transportation of military equipment, but the problem of moving tactical equipment in the field of combat is so especial, that the solution of motorizing such equipment has never seemed obvious, and mechanical propulsion has not heretofore been applied to this purpose.

Nothing has been found practicable to supplant man power in the hauling and positioning of gun carts and other like equipment as above set forth, on the field of action, since man's intelligence is more instantly applicable to the exigencies of the moment for moving or shifting the vehicles. He does not require to be harnessed or unharnessed, he does not require an accompanying heavy fuel supply, he is capable of immediate effort at concealment and can place himself in a position presenting a target of minimum size and visibility.

The use of internal combustion engines, broadly considered has been frowned upon as being impracticable since such engines as may have been in contemplation would add so much weight to the cart as to cause its wheels to sink in plowed or rough ground interfering with traction, while the quantity of fuel which it would be necessary to provide, would be a serious impediment to transportation. Furthermore, motor transportation, except in the case of tanks, presupposes a comparatively smooth and formal terrain, a condition which is neither expected nor frequently met at the battle front.

Notwithstanding its obvious advantages, the employment of man power for the propulsion and maneuvering of the tactical infantry equipment seriously handicaps the movements of the troops inasmuch as the unavoidable weight of the equipment reduces the possible speed at which it may be moved, to two miles or less per hour, which determines the speed of movement of the troops lest they out-distance the field pieces on the advance or leave them behind in retreat.

The present invention has for its principal object the provision, in machine gun carts, ammunition carts, reel carts, instrument carts and like equipment, of an internal combustion engine in driving relation to the wheels, not for the purpose of supplanting man power as the motive agent, but as auxiliary to, simultaneously applied with, and assisting, the human agency.

Another object of the invention is to provide a motor that shall be light in weight, of small horse power, preferably developing a speed of from two to four miles per hour and requiring only a small supply of fuel, for example, enough for fifteen miles, a day's march.

A further object of the invention, it being presumed that the cart is two wheeled on a single axis, is to place the motor in a balanced position relative to the axle so that its weight will not be added to the burden of the draft.

Other objects of the invention will appear as the following description of a number of practical applications thereof proceeds.

In the drawings which accompany and form a part of the following specification and throughout the several figures of which the same characters of reference have been employed to designate identical parts:

Figure 1 is a side elevation of a machine gun cart embodying the principles of the invention;

Figure 2 is a plan view;

Figure 3 is an end view partly in section and with one of the wheels partly broken away;

Figures 4 and 5 are side and plan views of an ammunition cart embodying the invention; and Figures 6 and 7 are respectively side and plan views of a reel cart.

Referring now in detail to the several figures, and first adverting to the group of Figures 1, 2 and 3, the numeral 1 represents the longitudinal frame member suitably supported by wheels 2 and 3 at the ends of a live axle 4. The longitudinal frame member is expanded at an intermediate point which lies above the axle to provide spaced side frame members 5 and 6 constituting a bed for the internal combustion engine 7, the latter being secured to the frame, and so positioned that when the frame is in horizontal position a line passing through the center of gravity of the engine shall also pass through the axle 4. Thus the weight of the engine is balanced when the cart is being drawn, and when the frame member 1 is against the ground in firing position, the engine is only slightly out of balance so that no excessive effort is required manually to elevate the frame to horizontal position.

The engine is designed to be placed as low as possible above the axle and with this end in view the crank case 8 of the engine is developed into a differential housing 9 through the opposite sides of which the respective halves of the axle pass. The differential is preferably of the locking type so that while ordinarily the differential is active, permitting the vehicle to be turned around curves with ease, yet should one of the wheels become mired, the differential may be locked positively distributing the power to both wheels.

Brake plates 10 and 11 are preferably formed integral with or may be secured to the sides of the differential housing and surrounding the axle, and brake drums 12 and 13 may be secured to the axle halves in operative relation to the brake plates, the latter carrying the brake mechanism 14 which engages said drums. The motor control or controls may extend to the forward end or tongue 15 of the frame member 1, being represented by the handle 16, and the differential and brakes may also be actuated from a point adjacent the forward end of the vehicle by the handles 17 and 18.

Auxiliary elements such as a fixed support 19 and a rest wheel 20 may be provided, but since these are common to the solely hand drawn type of appartus they do not form part of the present invention.

A machine gun is adjustably mounted in known manner upon a tripod 21 having the legs 22 and 23 detachably clamped to a transverse board 24 suitably secured to the frame. The forward leg 25 is clampably secured to the longitudinal frame member 1. The machine gun is at such height that its arc of operation is not interfered with by the presence of the engine.

In that adaptation of the invention shown in Figures 4 and 5, the chassis is constituted by the longitudinal frame member 1 and the spaced side members 5 and 6, the same as in the machine gun cart above described and the engine 7 is supported in a similar manner in balanced relation with respect to the axle. Differential and brake construction may be the same, and are omitted from these figures in the interest of brevity.

The body of the ammunition cart is constituted by a pair of long side boxes 27 and 28 symmetrically spaced on opposite sides of the engine, end boxes 29 and 30 symmetrically spaced forwardly and rearwardly of the axle and preferably, with smaller side boxes 31 and 32 arranged in balanced relation with respect to the axle and between the long boxes and the wheels 2 and 3. The boxes or receptacles are preferably spaced slightly away from the engine on all sides. The ammunition cart may be provided with transverse racks 33 and 34, although these are details of convenience and not particularly concerned with the inventive concept.

Figures 6 and 7 illustrate the reel cart which in addition to the generic inventive principle, presents specific novel features of construction.

In this showing of the invention, the motor is mounted in balanced relation to the axle 4. The latter is extended to a suitable distance on both sides of the engine and has loosely mounted thereupon the wire reels 35 and 36. Said reels may be clutched to the power plant when the vehicle is running by clutch elements 37 and 38 splined on the live axle and being brought into operative relation to complementary clutch elements 39 and 40 at the ends of the reels 35 and 36. When the vehicle is stationary, the reels may be wound or unwound by hand. The numeral 41 represents a radio generator which may be driven by the prime mover.

It will be understood that in all instances, the cart is drawn by men pulling upon the tongue 15. The cart is likewise guided by men pulling the tongue over to the right or left. The internal combustion engine is at the same time driving the wheels and easing the load to the extent of the speed which the engine is imparting to the vehicle and which is controlled by the handle 16. If the engine is propelling the cart at four miles per hour, all the men have to do is guide it. If the speed of the engine is less than that of the men, the latter are only called upon to supply a proportionate part of the power required to draw the vehicle. The engine being small, does not add materially to the area of the target presented by the cart and it is contemplated that the engine shall have an efficient muffler so that it will not betray the presence of the equipment by the noise of the exhaust.

It will be understood that in the case of a machine gun, the latter can be dismounted from the cart and set up upon the ground and that in the case of all the vehicles the wheels can be removed and the carts lowered to the ground when circumstances require.

While I have in the above description disclosed what I believe to be preferred and practical embodiments of my invention, it will be understood to those skilled in the art, that the specific details of construction as illustrated and described are merely by way of example and not to be construed as limiting the scope of the invention as claimed.

What I claim is:

A tactical infantry vehicle comprising in combination, a frame, an axle supporting said frame, wheels at the ends of said axle forming the sole ground support of said vehicle when the latter is being drawn, a motor on said frame drivingly connected with said wheels, said motor being position in substantially balanced relation above said axle when said frame is horizontal, a tongue extending forwardly of said frame serving as a means for the manual pulling of said vehicle, the sole means of steering it, and functioning as an additional point of ground support when said vehicle is in repose position, preventing the motor being tilted materially off balance by the tilting of said frame.

MATTHEW A. PALEN.